(12) United States Patent
Raz

(10) Patent No.: US 12,263,642 B2
(45) Date of Patent: Apr. 1, 2025

(54) METHOD AND SYSTEM FOR DETERMINING AN AMOUNT OF PRINTING MATERIAL POWDER IN A MULTIOBJECT BUILD JOB

(71) Applicant: Siemens Industry Software Ltd., Tel Aviv (IL)

(72) Inventor: Gal Raz, Herzliya (IL)

(73) Assignee: Siemens Industry Software Ltd., Tel Aviv (IL)

( * ) Notice: Subject to any disclaimer, the term of this patent is extended or adjusted under 35 U.S.C. 154(b) by 388 days.

(21) Appl. No.: 17/782,709

(22) PCT Filed: Dec. 10, 2019

(86) PCT No.: PCT/IB2019/060597
§ 371 (c)(1),
(2) Date: Jun. 6, 2022

(87) PCT Pub. No.: WO2021/116729
PCT Pub. Date: Jun. 17, 2021

(65) Prior Publication Data
US 2023/0008161 A1    Jan. 12, 2023

(51) Int. Cl.
*B29C 64/386* (2017.01)
*B33Y 50/00* (2015.01)
*G05B 19/4099* (2006.01)

(52) U.S. Cl.
CPC .......... *B29C 64/386* (2017.08); *B33Y 50/00* (2014.12); *G05B 19/4099* (2013.01); *G05B 2219/49023* (2013.01)

(58) Field of Classification Search
None
See application file for complete search history.

(56) References Cited

U.S. PATENT DOCUMENTS

| | | | |
|---|---|---|---|
| 10,286,484 B1 * | 5/2019 | McCarthy | B23K 26/0823 |
| 2004/0006405 A1 * | 1/2004 | Chen | B33Y 50/02 |
| | | | 700/106 |
| 2014/0028699 A1 | 1/2014 | Kurtz et al. | |
| 2014/0288699 A1 * | 9/2014 | Williams | B29C 64/25 |
| | | | 700/233 |

(Continued)

FOREIGN PATENT DOCUMENTS

CN    110560691 A    12/2019

*Primary Examiner* — Hua Lu
(74) *Attorney, Agent, or Firm* — Laurence A. Greenberg; Werner H. Stemer; Ralph E. Locher

(57) ABSTRACT

Systems and a method determine an amount of printing material powder for 3D printing an object a multi-object printing job. Data on the following is received: a 3D-model of the object, a volume and a surface of the object, data on a thickness of a powder, on characteristics of the build chamber, a volume of a no build zone and a volume of a net build zone, an estimation of a volume of recyclable interstitial powder, on a powder density and on a solid density of the printing material and on a recycling ratio. The following quantities are determined: a volume of the powder layer around the object, a dilated object contribution, the amount of used powder due the dilated object, the amount of lost powder in the no build zone, the amount of lost powder in the net build zone and the amount of printing material required.

12 Claims, 5 Drawing Sheets

(56) References Cited

U.S. PATENT DOCUMENTS

| | | | |
|---|---|---|---|
| 2015/0266236 A1* | 9/2015 | Farah | G01R 1/18 |
| | | | 324/663 |
| 2017/0021569 A1* | 1/2017 | Puigardeu Aramendia | ............... |
| | | | B29C 64/205 |
| 2017/0072467 A1* | 3/2017 | Zehavi | B33Y 10/00 |
| 2017/0355137 A1* | 12/2017 | Ederer | B29C 64/165 |
| 2018/0036950 A1* | 2/2018 | Vilajosana | B29C 64/357 |
| 2018/0141685 A1* | 5/2018 | Colson | B65B 5/02 |
| 2018/0369910 A1* | 12/2018 | G?nther | B22F 12/41 |
| 2019/0091766 A1* | 3/2019 | Kasperchik | B22F 1/107 |
| 2019/0134705 A1* | 5/2019 | Sheinman | B22F 12/53 |
| 2019/0134897 A1* | 5/2019 | Williams | B33Y 30/00 |
| 2019/0151954 A1* | 5/2019 | Xiao | B22F 12/90 |
| 2019/0152155 A1 | 5/2019 | Gonzalez et al. | |
| 2019/0201982 A1* | 7/2019 | Lombardo | B22F 5/10 |
| 2020/0110025 A1* | 4/2020 | Yacoubian | G01N 21/4788 |
| 2020/0207015 A1* | 7/2020 | Pattekar | B29C 64/35 |
| 2020/0223144 A1* | 7/2020 | Sanroma Garrit | G06F 30/00 |
| 2021/0046711 A1* | 2/2021 | Fernandez Aymerich | ............... |
| | | | B22F 10/36 |
| 2021/0205887 A1* | 7/2021 | Huang | B29C 33/3842 |
| 2021/0311466 A1* | 10/2021 | Yang | B22F 10/28 |
| 2021/0349428 A1* | 11/2021 | Riss | B33Y 50/02 |
| 2021/0387415 A1* | 12/2021 | Crabtree | B33Y 50/00 |
| 2022/0016842 A1* | 1/2022 | Leyva Mendivil | B33Y 10/00 |

* cited by examiner

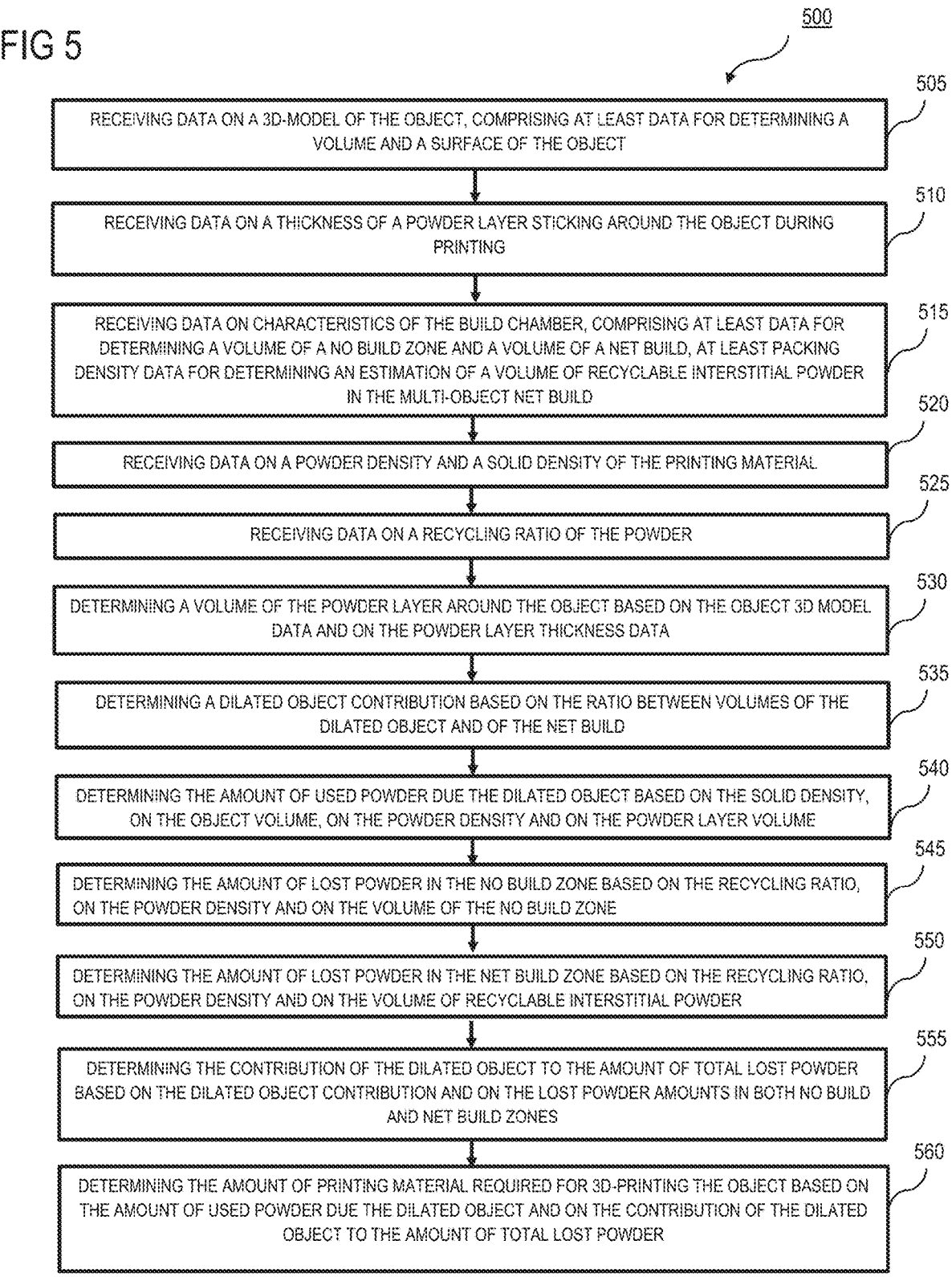

METHOD AND SYSTEM FOR DETERMINING AN AMOUNT OF PRINTING MATERIAL POWDER IN A MULTIOBJECT BUILD JOB

TECHNICAL FIELD

The present disclosure is directed, in general, to computer-aided design, visualization, and manufacturing ("CAD") systems, product lifecycle management ("PLM") systems, product data management ("PDM") systems, and similar systems, that manage data for products and other items (collectively, "Product Data Management" systems or PDM systems). More specifically, the disclosure is directed to systems related to additive manufacturing or three-dimensional ("3D") printing.

BACKGROUND OF THE DISCLOSURE

Powder bed 3D-printing technologies, among other types of additive manufacturing technologies, are commonly utilized to produce custom-manufactured plastic parts departing from 3D-model data of the part.

Examples of powder bed 3D-printing technologies include, but are not limited to, Multi Jet Fusion (MJF) technologies and Selective Laser Sintering (SLS) technologies. MJF and SLS technologies are used for manufacturing high-quality plastic parts using a quality thermoplastic material, generally based on polyamide, also known as Nylon 12. Both technologies function by thermally fusing also known as sintering, on a layer-by-layer basis, the polyamide powder particles to obtain a solid part in accordance with a provided 3D-model.

The key difference between MJF and SLS technologies is their heat sources, MJF printing uses an ink as a fusing agent for promoting the absorption of infrared light and SLS printing uses a laser to scan and fuse every powder cross-section.

SLS printers print in a closed and temperature-controlled heated build chamber. A tray platform, also called bed, moves on a vertical z-axis inside the build chamber where material powder is deposited layer-by-layer by a roller called recoater. The laser device at the top of the chamber emits a beam that is directed with mirrors to draw a mask on the top layer of the powder. The beam applies energy and sinters the powder selectively, or in other words, it changes the printing material stage from powder to solid by heating the grains. Layer-by-layer, after each layer sintering, the powder tray platform is dropped slightly down on the z-axis, another layer of powder is spread by the recoater and then the laser beam activates once more so that an additional solid layer is generated on top of the previously printed layer. Layer-by-layer the process is repeated until the part is completed.

With MJF technology, an energy absorbent agent is selectively applied to the top powder layer whose surface is then exposed to heat from above so that the heat energy is collected to change the printing material stage from powder to solid.

At the end of the printing process, the bin full of powder is taken out of the printer. The printed parts are hidden inside the bin and are then separated from the powder in an unpacking station. A certain ratio of the "cooked" powder can be reused after mixing with fresh powder at a certain recycle ratio determined by the manufacturer. For example, the manufacturer can recommend a recycle ratio $R_{recycle}$ as a ratio between the weight of new powder and the weight of used powder.

An advantage of powder bed printing techniques is that the non-sintered powder is used to support the printed parts, so that, differently than for other printing techniques, special support structures are not required.

Another main advantage of powder bed MJF and SLS printing technologies versus other printing technologies is the capability of fabricating multiple parts in one build job by fitting the multiple parts within the boundaries of the printing chamber via nesting so that the full height of the bin can be utilized.

In the art, it is an important task to determine the amount of 3D-printing material necessary for manufacturing a single part in a multiple-part printing job.

Typically, such techniques to estimate the printing powder amount for printing a single part are required to provide sufficiently reliable results without incurring in too complex mathematical calculations. In fact, while data on the 3D-model of one single given part may be known, it is often the case that the geometries and the number of the other parts in the same build job are often not yet known.

In the art, known and used techniques for predicting the amount of powder for printing a single part in a multi-part print job rely on calculations based on powder densities and on volumes of the single part and/or on volumes of the part bounding boxes.

Unfortunately, such known techniques provide prediction results which are unreliable in particular due to the fact that the polymer solid density is much higher than the polymer powder density and also due to the fact that the other several parts manufactured in one printing job are often unknown and may defer in geometry and dimensions.

Improved techniques are therefore desirable.

SUMMARY OF THE INVENTION

Various disclosed embodiments include methods, systems, and computer readable mediums for determining an amount of printing material powder for 3D printing an object in a build chamber of a multi-object printing job. A method includes receiving data on a 3D-model of the object; wherein the 3D-model data comprise at least data for determining a volume and a surface of the object. The method further includes receiving data on a thickness of a powder layer sticking around the object during printing. The printed object surrounded by its powder layer is hereinafter referred as the dilated object. The method further includes receiving data on characteristics of the build chamber. The chamber characteristics data comprises at least data for determining a volume of a no build zone and a volume of a net build zone, at least packing density data for determining an estimation of a volume of recyclable interstitial powder in the multi-object net build zone. The method further includes receiving data on a powder density and on a solid density of the printing material. The method further includes receiving data on a recycling ratio of the powder. The method further includes determining a volume of the powder layer around the object based on the object 3D model data and on the powder layer thickness data. The method further includes determining a dilated object contribution based on a ratio between volumes of the dilated object and of the net build. The method further includes determining the amount of used powder due the dilated object based on the solid density, on the object volume, on the powder density and on the powder layer volume. The method further includes determining the amount of lost powder in the no build zone based on the recycling ratio, on the powder density and on the volume of the no build zone. The method further includes determining the amount of lost powder in the net build zone based on the recycling ratio, on the powder density and on the volume of recyclable interstitial powder. The method further includes determining the contribution of the dilated object to the amount of total lost powder based on the dilated object contribution and on the lost powder amounts in both no build and net build zones. The method further includes determining the amount of printing material required for 3D printing the object based on the amount of used powder due the dilated object and on the contribution of the dilated object to the amount of total lost powder.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE FIGURES

For a more complete understanding of the present disclosure, and the advantages thereof, reference is now made to the following descriptions taken in conjunction with the accompanying drawings, wherein like numbers designate like objects, and in which:

FIG. 5 illustrates a flowchart for determining an amount of printing material powder for 3D printing an object in a multi-object printing job in accordance with disclosed embodiments.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Previous techniques for determining the amount of powder for 3D-printing an object in a multi-object build job may require much time, much effort and/or may be unreliable. The embodiments disclosed herein provide numerous technical benefits, including but not limited to the following examples.

Embodiments may advantageously enable a reliable calculation of the relative contribution of a part to the required amount of printing powder in a multi part build chamber.

Embodiments may conveniently enable a reliable calculation of the powder amount required to print a single part in a multi-part build job based on data of the single part surface and on data of the single part volume.

Embodiments may advantageously enable a reliable cost calculation of 3D printing a single part in a multi-part job based on data of the single part surface and on data of the single part volume.

Figure 1:
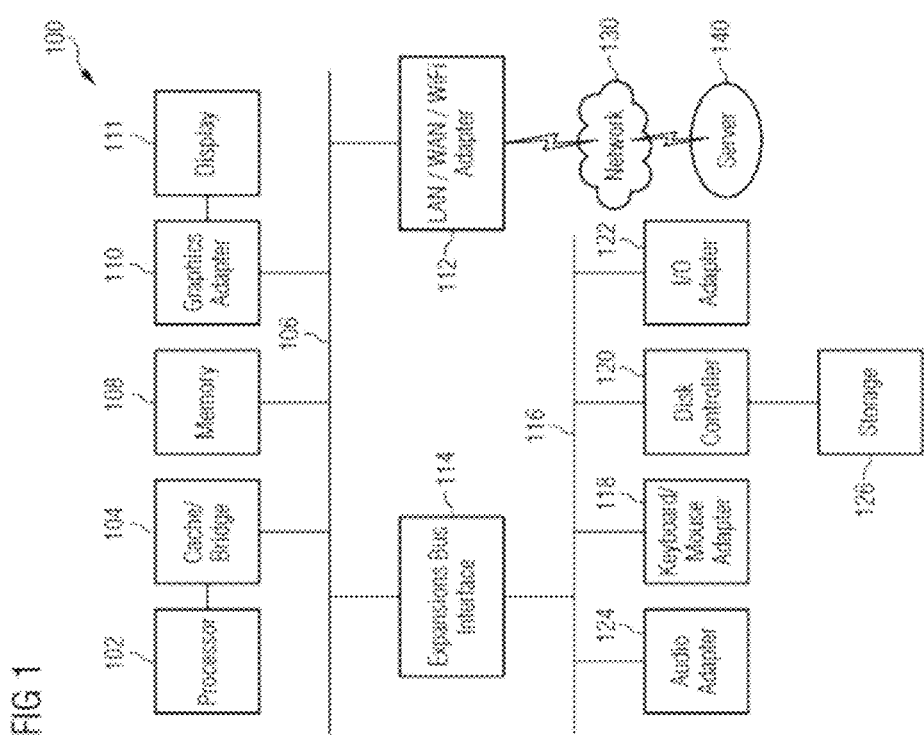
FIG. 1 illustrates a block diagram of a data processing system in which an embodiment can be implemented.

FIG. 1 illustrates a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 illustrated can include a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but are not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/ WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
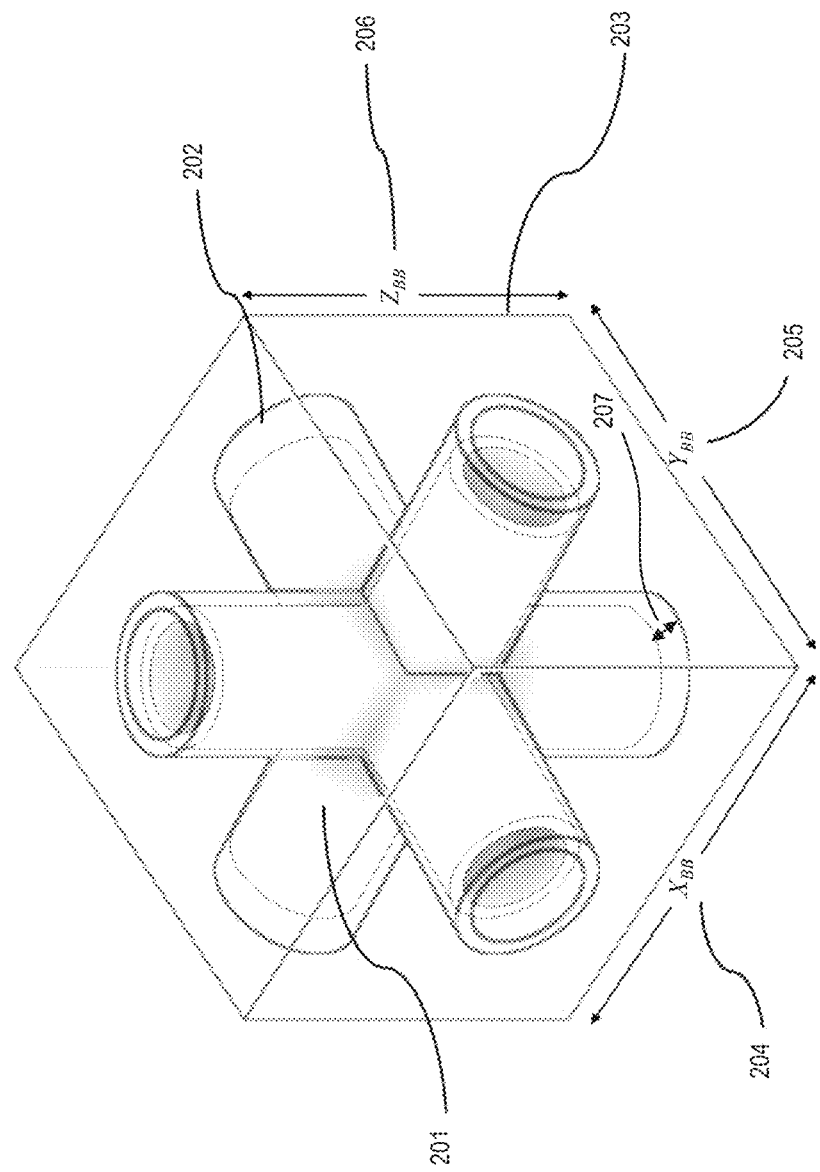
FIG. 2 is a drawing schematically illustrating an example of a part to be 3D printed and its related bounding box.

FIG. 2 is a drawing schematically illustrating an example of a part to be 3D printed and its related bounding box.

In FIG. 2, a part P 201 is shown. As used herein, the terms part and object refer to a body having a corresponding 3D model and to be custom manufactured via powder bed 3D printing technologies. In embodiments, the 3D model of the part may typically be a CAD model provided by a user requesting a custom 3D printing job.

The part P 201 has its own volume $V_P$ and a surface area $A_P$. In embodiments, part volume $V_P$ and surface area $A_P$ of the part P 201 are determinable from the provided 3D model of the part 201, typically calculable via a 3D software tool. A bounding box BB 203, drawn at the boundaries of the part 201, is shown. The dimensions 204, 205, 206 of the part bounding box 203 are $X_{BB}$, $Y_{BB}$, $Z_{BB}$. Around the part P is shown a powder layer 202 of the part drawn around the part, herein simply denoted as powder layer. The powder layer is a layer that sticks around the part during the powder bed printing process and is removed at the end of its process. The powder of this layer is considered lost powder because it is wasted during the printing post processing and because it usually cannot be recycled. The powder layer has a certain thickness 207 herein also denoted as length of the part surface offset or simply surface offset $L_{offset}$. The surface offset $L_{offset}$ typically depends on the material powder characteristics and on the model of the printer. In embodiments, a value estimation of the surface offset $L_{offset}$ may be provided for example by the manufacturer or administrator. The part or object surrounded by its sticking powder layer is herein called "dilated part" or "dilated object".

Figure 3:
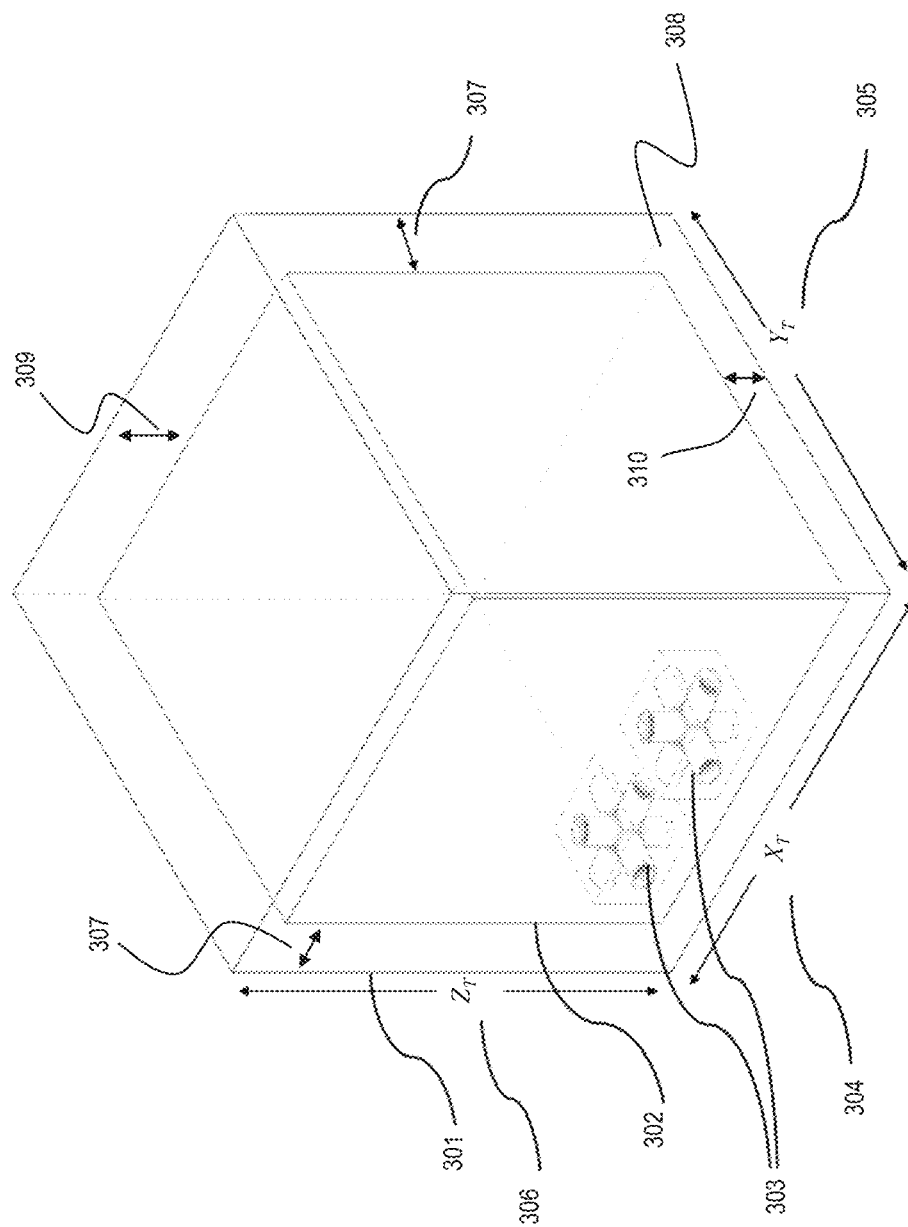
FIG. 3 is a drawing schematically illustrating an example of build chamber with two parts.

FIG. 3 is a drawing schematically illustrating an example of build chamber with two parts.

In FIG. 3, a printer build chamber 301 is shown with its base platform 308. The printer build chamber T is also known as build tray, build, printing chamber or tray. The tray base 308 has dimension $X_T$, $Y_T$, respectively the width 304 and the length 305 of the tray base 308. The volume $V_T$ of the tray 301 is determined by computing the product of the three dimension values of the chamber, $X_T * Y_T * Z_T$ where $Z_T$ represents the height 306 of the tray 301.

Inside the tray 301, several no build zones 307, 309, 310 are shown. No build zones are powder zones within the printing chamber 301 which cannot be used for building parts 303. The parts 303 are manufactured in the net build chamber 302 or herein simply denoted as net build Net_B 302. No build zones may be lateral zones as for example the gaps 307 on the side of the tray or may be vertical zones as for example the two vertical top and bottom cushions 309, 310. Typically, the space of the no build zones may be used as support material for the parts 303 or as a special local zone to measure the temperature of the chamber, for example for certain SLS printing chambers.

Figure 4:
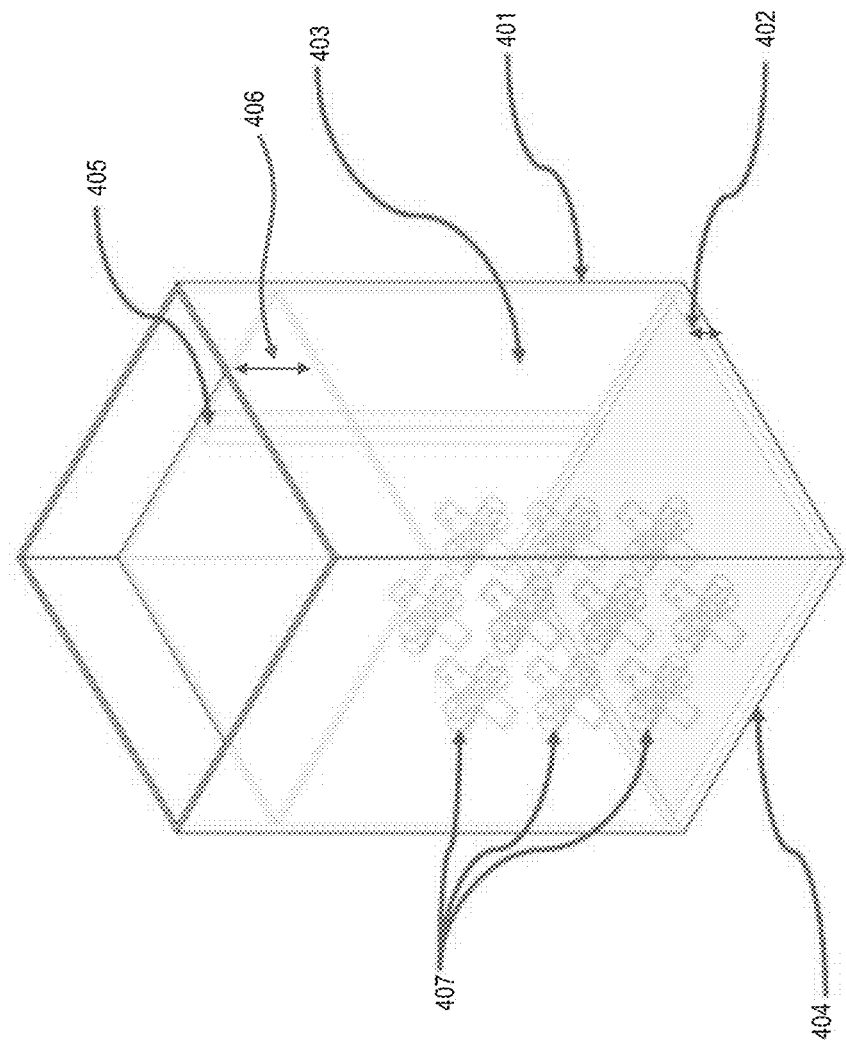
FIG. 4 is a drawing schematically illustrating another example of build chamber with multiple parts.

FIG. 4 is a drawing schematically illustrating another example of build chamber with multiple parts.

In FIG. 4, it is shown another example of a 3D printing chamber 401 with multiple printed parts 407 nested together. In the printing chamber 401 three no build zones 402, 405, 406 are shown: a bottom no build zone 402 on top of a build platform 404, a top no build zone 406 and a local no build zone 405 having same height as a net build zone 403 of the chamber 401.

Exemplary Embodiments for Determining a Required Powder Amount for Printing a Single Part In two exemplary embodiments, calculations for determining the amount of printing powder needed to manufacture a single part in a multi part printing job are described for MJF and SLS examples.

Assume, for illustration purposes, that these two exemplary embodiments refer to one of the scenarios of FIGS. 2 to 4 where a part and two different multi-part chambers are shown. In other embodiments (not shown), the single part may have a shape different than any of the shapes of the other parts in the same multi-part build job.

Assume that a design engineer, herein denoted as user, provides as input data, data on a 3D model of a single part P from which the area $A_P$ of the part surface and the volume $V_P$ of the part may be determined. In other embodiments, the area $A_P$ of the part surface and the volume $V_P$ of the part may be provided directly.

Other data regarding the specific printing process are received as predefined data or as input data for example from an administrator of a manufacturing company, and such specific data is herein denoted as manufacturer data.

Examples of manufacturer data include, but are not limited to, data on characteristics of the printing material, like for example density of the solid printing material $\rho_{solid}$ and density of the material powder $\rho_{powder}$, data on characteristics of the printing chamber T, like for example its dimensions and dimensions of the no build zones, data on estimation of the thickness of the part powder layer $L_{offset}$ and other relevant data. Other examples of manufacturer data include, but are not limited to, data on recommended recycle powder ratio $R_{recycle}$ and typical part packing density of a job $R_{job-packing}$. Other examples of manufacturer data include, but are not limited to, parameters for cost calculations as for example powder and agent costs pro Kg $c_{powder}$, $c_{agent}$ and printer speed $v_{printing}$ and printer cost per hour $c_{printing}$.

In example embodiments, user and manufacturer data are provided as input as listed in the below examples.

User input data:
$A_P$ where $A_P$ denotes the area of the surface of the part P, e.g. measured in cm$^2$;
$V_P$ where $V_P$ denotes the volume of the part P, e.g. measured in cm$^3$;

Manufacturer input data:
$L_{offset}$ where $L_{offset}$ denotes an estimation of the surface offset or the thickness of the part powder layer, e.g. measured in cm;
$\rho_{solid}$ where $\rho_{solid}$ denotes the density of solid printing material, e.g. measured in g/cm$^3$;
$\rho_{powder}$ where $\rho_{powder}$ denotes the density of printing powder, e.g. measured in g/cm$^3$;
$X_T$, $Y_T$, $Z_T$ where $X_T$, $Y_T$, $Z_T$ denote the width, length, height of tray T, e.g. measured in cm;
$X_{NB-side}$, $Y_{NB-side}$, $Z_{NB-bottom}$, $Z_{NB-top}$, $X_{loc}$, $Y_{loc}$ where $X_{NB-side}$, $Y_{NB-side}$, $X_{loc}$, $Y_{loc}$, $Z_{NB-bottom}$, $Z_{NB-top}$, denote the dimensions of the no build zones, side, local and vertical ones;
$R_{recycle}$ where $R_{recycle}$ represents the new powder recycling weight ratio which is the manufacturer recommended ratio between new and used powder weights;
$R_{job-packing}$ where $R_{job-packing}$ represents the average part packing density of a job in the net build zone e.g. as an estimate of the ratio between the volume of the dilated parts and the volume of the net build.

In example embodiments, the amount of printing powder for printing a single part is determined via the below equations (m1)-(m16) for a MJF printing example and via the below equations (s1)-(s16) for a SLS printing example.

Equations (m7), (s7) are an example of how the volume of the powder layer $V_{offset}$ sticking around the part P may be determined based on the layer thickness and the part surface area, e.g. by multiplying the layer thickness with the area of the part surface. In other embodiments, the volume of the powder layer may be determined as a function of data of one or more layer thicknesses and on data of a 3D surface model of the part.

Equations (m13), (s13) are an example of how a relative contribution $R_{P-tot}$ of the dilated object in the net build zone may be determined as a ratio between the volume of the dilated part and the volume of the net build.

Equations (m10), (s10) are an example of how the amount of used powder due the dilated part may be determined based on the solid density, the part volume, the powder density and the powder layer volume.

Equations (m14), (s14), (m11), (s11) are an example of how the amount of lost powder in the no build zone may be determined based on the recycling ratio, the powder density and the volume of the no build zone.

Equations (m14), (s14), (m12), (s12) are an example of how the amount of lost powder in the net build zone may be determined based on the recycling ratio, the powder density and the volume of recyclable interstitial powder in the multi-object net build.

Equations (m14), (s14) are an example of how the contribution of the dilated object to the weight of total lost powder may be determined based on the dilated part contribution and on the lost powder weights in both the no build and net build zones.

Equations (m16), (s16) are an example of how the contribution of the amount of printing material required for 3D-printing the part may be determined based on the weight of used powder due the dilated part and on the contribution of the part object to the weight of total lost powder.

Powder Amount Calculation for a MJF Printing Embodiment Example $$W_P = V_P * \rho_{solid} \quad (m1)$$

where $W_P$ denotes the weight of the part P.

$$V_{NB-side} = X_T * Y_T - (X_T - X_{NB-side}) * (Y_T - Y_{NB-side}) * (Z_T - Z_{NB-top} - Z_{NB-bottom}) \quad (m2)$$

where $V_{NB-side}$, denotes the volume of the no build zone of the side walls and where $X_{NB-side}$, $Y_{NB-side}$ are the widths of the side gaps.

$$V_{NB-vertic} = X_T * Y_T * (Z_{NB-top} + Z_{NB-bottom}) \quad (m3)$$

where $V_{NB-vertic}$ denotes the volume of the no build zones at the top and bottom of the printing chamber.

$$V_{NB-tot} = V_{NB-side} + V_{NB-vertic} \quad (m4)$$

where $V_{NB-tot}$ is the volume of the total no build zone NB-tot.

$$W_{powder\ in\ NB-tot} = V_{NB-tot} * \rho_{powder} \quad (m5)$$

where $W_{powder\ in\ NB\_tot}$ is the weight of powder in the total no build zone.

$$V_{net-B} = X_T * Y_T * Z_T - V_{NB} \quad (m6)$$

where $V_{net-B}$ is the volume of the net build zone within tray T.

$$V_{offset} = L_{offset} * A_P \quad (m7)$$

where $V_{offset}$ is the volume of the powder layer.

$$V_{P-tot} = V_P + V_{offset} \quad (m8)$$

where $V_{P-tot}$ is the volume of the "total part" which is the part together with its powder layer, the total part is herein denoted as "dilated part".

$$W_{offset} = \rho_{powder} * V_{offset} \quad (m9)$$

where $W_{offset}$ is the weight of the part powder layer.

$$W_{P-tot} = W_P + W_{offset} \quad (m10)$$

where $W_{P-tot}$ is the weight of the dilated part. This powder amount $W_{P-tot}$ is lost powder because it is non-recyclable powder.

$$W_{NB\ powder} = \rho_{powder} * V_{NB-tot} \quad (m11)$$

where $W_{NB\ powder}$ is the fixed amount of powder needed in the non-build zone. This powder amount is recyclable powder, its lost powder amount depends on the recycle ratio.

$$W_{interst.\ powder} = \rho_{powder} * (1 - R_{job-packing}) * V_{net-B} \quad (m12)$$

where $W_{interst.\ powder}$ is an estimate of the total amount of recyclable powder in the interstitial zones between the dilated printed parts in the net build zone.

$$R_{P-tot} = V_{P-tot} / V_{net-B} \quad (m13)$$

where is $R_{P-tot}$ is the ratio between the volume of the dilated single part and the volume of the net build zone, thus representing the ratio of the volume contribution of the dilated single part P within the net build, hereinafter referred as dilated part contribution ratio.

$$W_{NB,P} = R_{P-tot} * R_{recycle} * W_{NB\ powder} \quad (m14)$$

where is $W_{NB,P}$ is the contribution of the dilated part to the lost powder of the non-build zone.

$$W_{interst.,P} = R_{P-tot} * R_{recycle} * W_{inters.\ powder} \quad (m15)$$

where is $W_{interst.,P}$ is the contribution of the dilated part to the lost powder of the interstitial zone in the net build.

$$W_{lost\ powder,\ P} = W_{P-tot} + W_{NB,P} + W_{interst.,P} \quad (m16)$$

where $W_{lost\ powder,\ P}$ is the weight of the total powder lost because of the printing of the part P.

Powder Amount Calculation for a SLS Printing Embodiment Example $$W_P = V_P * \rho_{solid} \quad (s1)$$

where $W_P$ is the weight of part P.

$$V_{NB-side} = X_T * Y_T - (X_T - X_{NB-side}) * (Y_T - Y_{NB\_side}) * (Z_T - Z_{NB-top} - Z_{NB-bottom}) \quad (s2)$$

where $V_{NB-side}$ denotes the volume of the no build zone of the side walls and where $X_{NB-side}$, $Y_{NB-side}$ are the widths of the side gaps.

$$V_{NB-loc} = (X_T * Y_T) * (Z_T - Z_{NB-top} - Z_{NB-bottom}) \quad (s2.1)$$

where $VV_{NB-loc}$ is the volume of the special local no build zone.

$$V_{NB-vertic} = X_T * Y_T * (Z_{NB-top} + Z_{NB-bottom}) \quad (s3)$$

where $V_{NB-vertic}$ denotes the volume of the no build zones at the top and bottom of the printing chamber.

$$V_{NB-tot} = V_{NB-side} + V_{NB-vertic} + V_{NB-loc} \quad (s4.1)$$

where $V_{NB-tot}$ is the volume of the total no build zone NB-tot.

$$W_{powder\ in\ NB-tot} = V_{NB-tot} * \rho_{powder} \quad (s5)$$

where $W_{powder\ in\ NB\_tot}$ is the weight of powder in the total no build zone.

$$V_{net-B} = X_T * Y_T * Z_T - V_{NB} \quad (s6)$$

where $V_{net-B}$ is the volume of the net build zone within tray T.

$$V_{offset} = L_{offset} * A_P \quad (s7)$$

where $V_{offset}$ is the volume of the powder layer.

$$V_{P-tot} = V_P + V_{offset} \quad (s8)$$

where $V_{P-tot}$ is the volume of the "total part" which is the part together with its powder layer, the total part is herein denoted as "dilated part".

$$W_{offset} = \rho_{powder} * V_{offset} \quad (s9)$$

where $W_{offset}$ is the weight of the part powder layer.

$$W_{P-tot} = W_P + W_{offset} \quad (s10)$$

where $W_{P-tot}$ is the weight of the dilated part. This powder amount $W_{P-tot}$ is lost powder because it is non-recyclable.

$$W_{NB\ powder} = \rho_{powder} * V_{NB-tot} \quad (s11)$$

where $W_{NB\ powder}$ is the fixed amount of powder needed in the non-build zone. This powder amount is recyclable powder, its lost powder amount depends on the provided recommended recycle ratio.

$$W_{interst.\ powder} = \rho_{powder} * (1 - R_{job-packing}) * V_{net-B} \quad (s12)$$

where $W_{interst.\ powder}$ is an estimate of the total amount of recyclable powder in the interstitial zones between the dilated printed parts in the net build zone.

$$R_{P-tot} = V_{P-tot} / V_{net-B} \quad (s13)$$

where is $R_{P-tot}$ is the ratio between the volume of the dilated single part and the volume of the net build zone, thus representing the ratio of the volume contribution of the dilated single part P within the net build, hereinafter referred as dilated part contribution ratio.

$$W_{NB,P} = R_{P-tot} * R_{recycle} * W_{NB\ powder} \quad (s14)$$

where is $W_{NB,P}$ is the contribution of the dilated part to the lost powder of the non-build zone $$W_{interst.,P} = R_{P-tot} * R_{recycle} * W_{inters.\ powder} \quad (s15)$$

where is $W_{interst.,P}$ is the contribution of the dilated part to the lost powder of the interstitial zone in the net build.

$$W_{lost\ powder,\ P} = W_{P-tot} + W_{NB,P} + W_{interst.,P} \quad (s16)$$

where $W_{lost\ powder,\ P}$ is the weight of the total powder lost because of the printing of the part P.

Exemplary Embodiments for Determining the Cost of Printing of a Single Part in a Multi-Part Chamber The amount of printing material calculated above is the weight of the consumed powder for 3D printing the single part and it may be used, in embodiments, for determining the cost of 3D printing the single part, for example when the powder cost per weight is given. In embodiments, the agent powder cost per weight may also be advantageously given, e.g received as manufacturer input data. The cost of 3D printing the single part may conveniently be determined as a function of the printing material weight and its cost.

In example embodiments, the cost of printing a single part is determined via the below equations (m17)-(m21.1) for a MJF printing example and via the below equations (s17)-(s21.2) for a SLS printing based on additional manufacturer input data. In the examples shown below, beside costs of consumables like printing powder and agent, other parameters on printing costs and margins are taken into account.

Additional Manufacturer Input Data:

$c_{printing}$ where $c_{printing}$ is the printing cost pro hour, e.g. measured in \$/hour;

$v_{printing}$ where $v_{printing}$ is the speed of the 3D printer on the z axis;

Mg margin on costs for setting customer prices;

$c_{powder}$ where $C_{powder}$ is the powder cost pro Kg, e.g. measured in \$/Kg;

$U_{agent}$ where is the percentage of agent amount to be used within the partpowder; e.g. 2% of the powder (for MJF printing only);

$c_{agent}$ where $c_{agent}$ is the agent cost pro Kg, e.g. measured in \$/Kg (for MJF printing only).

Cost Calculation for a MJF Printing Embodiment Example $$V_{printing\ per\ hour} = V_{printing} * X_T * Y_T \quad (m17)$$

where $V_{printing\ per}$ is the average printed volume by the 3D printer in one hour, e.g. measured in cm³/hour;

$$t_P = V_{P-tot} / V_{printing\ per\ hour} \quad (m18)$$

where $t_P$ is the contribution to the printing time of the part P, e.g. measured in hour;

$$C_{printing,P} = t_P * C_{printing} \quad (m19)$$

where $C_{printing,p}$ is the cost of printing due to part P, e.g. measured in $ $$C_{powder,P} = C_{powder} * W_{lost\,powder,P}/1000 \quad (m20)$$

where $C_{powder,P}$ is the cost for the powder due to the part; P $$C_{agent,P} = (U_{agent} * W_P) * 1000 * C_{agent} \quad (m20.1)$$

where $C_{agent,P}$ is the cost of agent for the part P;

$$P_P = (C_{powder,P} + C_{agent,P} + C_{printing\,per\,P}) * Mg \quad (m21.1)$$

where $P_P$ is the price for part P to be offered to a customer based on consumables and printing hourly rate.

Cost Calculation for a SLS Printing Embodiment Example $$V_{printing\,per\,hour} = V_{printing} * X_T * Y_T \quad (s17)$$

where $V_{printing\,per}$ is the average printed volume by the 3D printer in one hour, e.g. measured in cm³/hour;

$$t_P = V_{P\text{-}tot}/V_{printing\,per\,hour} \quad (s18)$$

where $t_P$ is the contribution to the printing time of the part P, e.g. measured in hour;

$$C_{printing,P} = t_P * C_{printing} \quad (s19)$$

where $C_{printing,p}$ is the cost of printing due to part P, e.g. measured in $;

$$C_{powder,P} = C_{powder} * W_{lost\,powder,P}/1000 \quad (s20)$$

where $C_{powder,P}$ is the cost for the powder due to the part P;

$$P_P = (C_{powder,P\,P} + C_{printing\,per\,P}) * Mg \quad (s21.2)$$

where $P_P$ is the price for part P to be offered to a customer based on consumables and printing hourly rate.

FIG. 5 illustrates a flowchart 500 of a method for determining by a data processing system the amount of printing material for 3D printing an object in a build chamber of a multi-object printing job by transforming printing material from a powder state into a solid via sintering, in accordance with disclosed embodiments. Such method can be performed, for example, by system 100 of FIG. 1 described above, but the "system" in the process below can be any apparatus configured to perform a process as described.

At act 505, data on a 3D-model of the object is received. The 3D-model data comprises at least data for determining a volume and a surface of the object. In embodiments, the 3D model data may be the CAD model of the object, data on the volume and surface of the object or any other data for determining the volume and the surface of the object.

At act 510, data on a thickness of a powder layer sticking around the object are received. The printed object surrounded by its powder layer is herein called the dilated object.

At act 515, data on characteristics of the chamber are received. The chamber characteristics data comprises at least data for determining a volume of a no build zone, data for determining a volume of a net build zone and at least packing density data for determining an estimation of the volume of recyclable interstitial powder in the multi-object net build zone. With the term interstitial powder, it is meant the powder in interstitial spaces among objects. In embodiments, examples of packing density data may include, but not limited by, an estimate of the average object packing density of a job in the net build zone e.g. as an estimate of the ratio between the volume of the objects—dilated or not—and the volume of the net build.

At act 520, data on a powder density the printing material and data on a solid density of the printing material are received.

At act 525, data on a recycling ratio of the printing material powder are received.

At act 530, the volume of the powder layer around the object is determined based on the object 3D model data and on the powder layer thickness data. In embodiments, the volume of the powder layer around the object is determined by calculating the product between the object surface area and the thickness of the powder layer.

At act 535, a relative volume contribution of the dilated object in the net build zone is determined based on a ratio between the volume of the dilated object and the volume of the net build. This relative volume contribution is hereinafter referred as dilated object contribution.

At act 540, determining the amount of used powder due the dilated object based on the solid density, the object volume, the powder density and the powder layer volume.

At act 545, the amount of lost powder in the no build zone is determined based on the recycling ratio, on the powder density and on the volume of the no build zone.

At act 550, the amount of lost powder in the net build zone is determined based on the recycling ratio, on the powder density and on the volume of recyclable interstitial powder in the multi-object net build.

At act 555, the contribution of the dilated object to the amount of total lost powder is determined based on the dilated object contribution and on the lost powder amounts in both the no build and net build zones;

At act 560, the amount of printing material required for 3D-printing the object is determined based on the amount of used powder due the dilated object and on the contribution of the dilated object to the amount of total lost powder. In embodiments, the cost of printing the object may preferably be determined based on the determined amount of printing material required for 3D-printing the object.

In embodiments, the cost of printing the object is conveniently determined based on the determined amount of printing material required for 3D-printing the object. In embodiments, 3D printing technology may conveniently be based on MJF technology or on SLS technology. In other embodiments, other different powder bed 3D printing technologies may advantageously be used.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

What is claimed is:

1. A method for determining, by a data processing system, an amount of printing material powder for 3D printing an object in a build chamber of a multi-object printing job, the method comprises the following steps of:
    receiving data on a 3D-model of the object, wherein the 3D-model data having at least data for determining a volume and a surface of the object;
    receiving data on a thickness of a powder layer sticking around the object during printing, wherein a printed object surrounded by the powder layer is hereinafter referred as a dilated object;
    receiving data on characteristics of the build chamber, wherein data on characteristics of the build chamber include at least data for determining a volume of a no build zone, which is a powder zone within the build chamber that cannot be used for building parts of the object, and a volume of a net build zone, which is a powder zone within the build chamber in which parts of the object are manufactured, and at least packing density data for determining an estimation of a volume of recyclable interstitial powder in a multi-object net build zone;
    receiving data on a powder density and on a solid density of the printing material powder;
    receiving data on a recycling ratio of the printing material powder, wherein the recycling ratio indicates an amount of powder that can be reused;
    determining a volume of the powder layer around the object based on the 3D model data and on powder layer thickness data;
    determining a dilated object contribution based on a ratio between volumes of the dilated object and of the net build zone;
    determining an amount of used powder due the dilated object based on the solid density, on object volume, on the powder density and on the volume of the powder layer;
    determining an amount of lost powder in the no build zone based on the recycling ratio, on the powder density and on the volume of the no build zone;
    determining an amount of lost powder in the net build zone based on the recycling ratio, on the powder density and on the volume of the recyclable interstitial powder;
    determining a contribution of the dilated object to an amount of total lost powder based on the dilated object contribution and on the lost powder amounts in both no build and net build zones; and
    determining an amount of the printing material powder required for the 3D printing of the object based on the amount of the used powder due the dilated object and on the dilated object contribution to the amount of total lost powder.

2. The method of claim 1, which further comprises determining the volume of the powder layer around the object by calculating a product between an object surface area and the thickness of the powder layer.

3. The method according to claim 1, which further comprises determining a cost of printing the object based on the amount of the printed material powder required for the 3D printing of the object.

4. The method according to claim 1, wherein the 3D printing is based on multi-jet fusion technology or on selective laser sintering technology.

5. A data processing system, comprising:
    a processor; and
    an accessible memory, the data processing system configured to:
        receive 3D-model data on a 3D-model of the object, wherein the 3D-model data containing at least data for determining a volume and a surface of the object;
        receive data on a thickness of a powder layer sticking around the object during printing, wherein a printed object surrounded by the powder layer is hereinafter referred as a dilated object;
        receive data on characteristics of a build chamber, wherein the data on the characteristics of the build chamber include at least data for determining a volume of a no build zone, which is a powder zone within the build chamber that cannot be used for building parts of the object, and a volume of a net build zone, which is a powder zone within the build chamber in which parts of the object are manufactured, and at least packing density data for determining an estimation of a volume of recyclable interstitial powder in a multi-object net build zone;
        receive data on a powder density and on a solid density of printing material;
        receiving data on a recycling ratio of the powder, wherein the recycling ratio indicates an amount of powder that can be reused;
        determine a volume of the powder layer around the object based on the 3D model data and on powder layer thickness data;
        determine a dilated object contribution based on a ratio between the volumes of the dilated object and of the net build zone;
        determine an amount of used powder for the dilated object based on the solid density, on the volume of the object, on the powder density and on the volume of the powder layer;
        determine an amount of lost powder in the no build zone based on the recycling ratio, on the powder density and on the volume of the no build zone;

determine an amount of lost powder in the net build zone based on the recycling ratio, on the powder density and on the volume of the recyclable interstitial powder;

determine a contribution of the dilated object to an amount of total lost powder based on the dilated object contribution and on the lost powder amounts in both the no build zone and the net build zone; and determine an amount of the printing material required for 3D printing the object based on the amount of used powder due the dilated object and on the dilated object contribution to the amount of total lost powder.

6. The data processing system according to claim 5, wherein the volume of the powder layer around the object is determined by calculating a product between an object surface area and the thickness of the powder layer.

7. The data processing system of claim 5, wherein the data processing system is further configured to determine a cost of printing the object based on the amount of the printed material required for the 3D printing of the object.

8. The data processing system of claim 5, wherein the 3D printing is based on multi-jet fusion technology or on selective laser sintering technology.

9. A non-transitory computer-readable medium encoded with executable instructions that, when executed, cause at least one data processing system to:

receive 3D-model data on a 3D-model of an object, wherein the 3D-model data contains at least data for determining a volume and a surface of the object;

receive data on a thickness of a powder layer sticking around the object during printing, wherein a printed object surrounded by the powder layer is hereinafter referred as a dilated object;

receive chamber characteristic data on characteristics of the build chamber, wherein the chamber characteristics data contains at least data for determining a volume of a no build zone, which is a powder zone within the build chamber that cannot be used for building parts of the object, and a volume of a net build zone, which is a powder zone within the build chamber in which parts of the object are manufactured, and at least packing density data for determining an estimation of a volume of recyclable interstitial powder in a multi-object net build zone;

receive data on a powder density and on a solid density of a printing material;

receive data on a recycling ratio of a powder, wherein the recycling ratio indicates an amount of powder that can be reused;

determine a volume of the powder layer around the object based on the 3D model data of the object and on a powder layer thickness data;

determine a dilated object contribution based on a ratio between volumes of the dilated object and of the net build zone;

determine an amount of used powder due the dilated object based on the solid density, on the volume of the object, on the powder density and on a powder layer volume;

determine an amount of lost powder in the no build zone based on the recycling ratio, on the powder density and on the volume of the no build zone;

determine an amount of lost powder in the net build zone based on the recycling ratio, on the powder density and on the volume of recyclable interstitial powder;

determine a contribution of the dilated object to an amount of total lost powder based on the dilated object contribution and on the lost powder amounts in both the no build zone and the net build zone; and determine an amount of the printing material required for 3D printing the object based on the amount of used powder due the dilated object and on the contribution of the dilated object to the amount of total lost powder.

10. The non-transitory computer-readable medium according to claim 9, wherein the volume of the powder layer around the object is determined by calculating a product between an object surface area and the thickness of the powder layer.

11. The non-transitory computer-readable medium according to claim 9, wherein a cost of printing the object is determined on the amount of the printed material required for the 3D printing of the object.

12. The non-transitory computer-readable medium of claim 9, wherein the 3D printing is based on multi-jet fusion technology or on selective laser sintering technology.

* * * * *